UNITED STATES PATENT OFFICE.

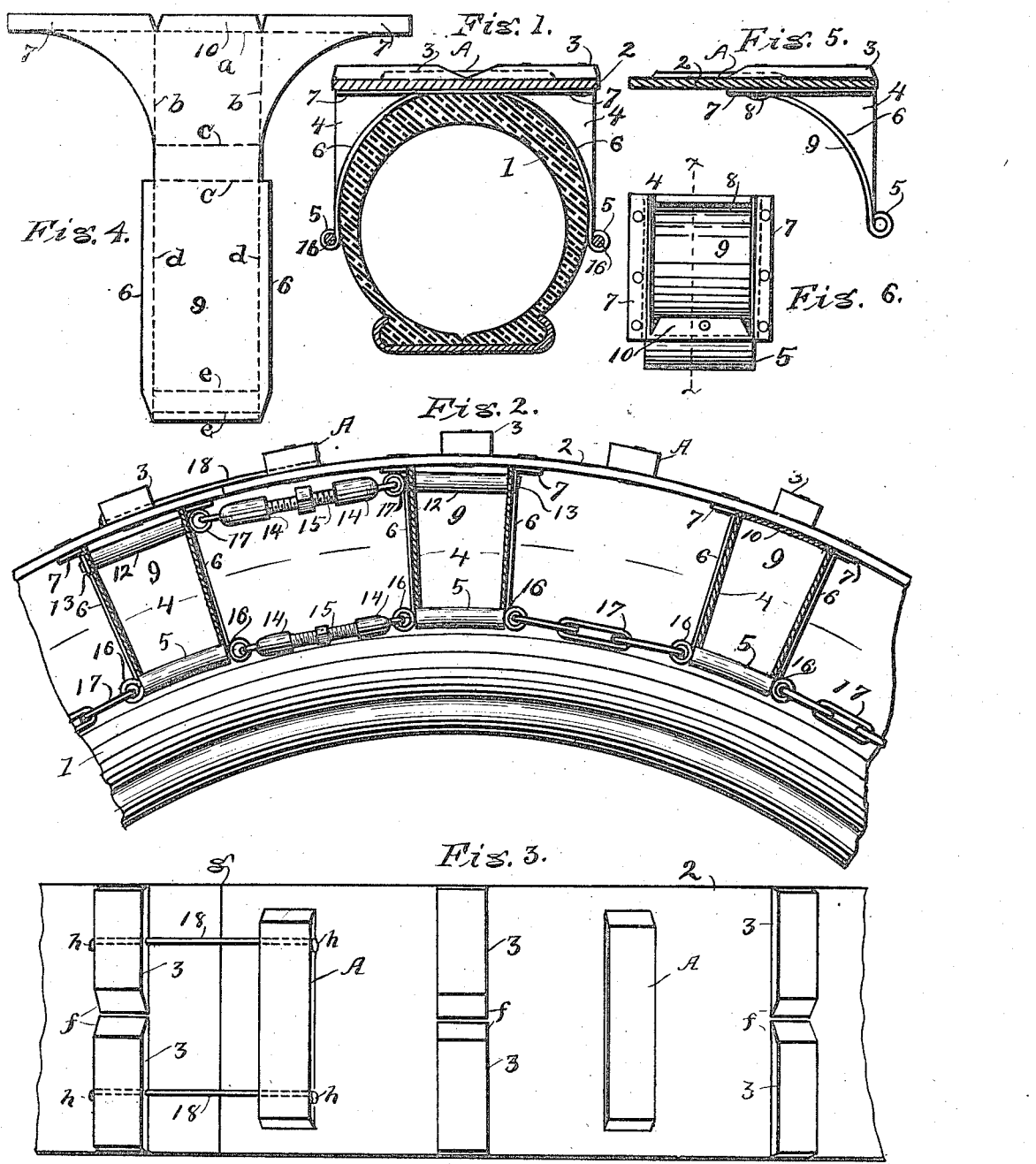

FRANK L. PEARSON, OF BOYNE FALLS, MICHIGAN.

SAND-CREEPER FOR AUTOMOBILES.

1,130,838.

Specification of Letters Patent.

Patented Mar. 9, 1915.

Application filed April 30, 1914. Serial No. 835,550.

*To all whom it may concern:*

Be it known that I, FRANK L. PEARSON, a citizen of the United States, residing at Boyne Falls, in the county of Charlevoix and State of Michigan, have invented certain new and useful Improvements in Sand-Creepers for Automobiles, of which the following is a specification.

My invention relates to improvements in shoes, or more properly speaking, sand creepers for temporary use on automobile tires, and its objects are: First, to provide a creeper that may be readily applied or removed. Second, to provide a creeper that will adjust itself to inequalities in the road without danger of breaking the cross-cleats. Third, to provide a creeper with which it will be impossible for sand and mud to wedge between the ends of the divided cleats. Fourth, to provide a creeper whose supporting cleats are so constructed that they will not, ordinarily, slip or creep on the tire. Fifth, to provide a creeper that may be drawn firmly and securely around the tire and held firmly in place. Sixth, to provide a light, indestructible set of ribs for supporting the creeper. I attain these objects by the mechanism illustrated in the accompanying drawing, in which—

Figure 1 is a transverse section of a tire with my creeper in place. Fig. 2 is a side elevation of a piece of the tire with several links of my device in place. Fig. 3 is a plan of the same. Fig. 4 is a plan of the blank from which the ribs for my creeper are formed. Fig. 5 is a sectional end view of the supporting belt with a rib and a cleat in place. Fig. 6 is a plan of a rib. Fig. 7 is a section of the same on the line $x$ $x$ of Fig. 6.

Similar letters and numerals of reference refer to similar parts throughout the several views in the drawing.

In the construction of this creeper I make use of a heavy rubber belt, 2, for a base upon which to secure the cleats 3 and A which cleats may be secured to the belt by any of the well known appliances in common use for such purposes, as by riveting. These cleats are, preferably, made of heavy bar metal, but any available material may be used. The cleats 3 3 are made in two sections, each extending practically half way across the belt, as shown in Fig. 3. The meeting ends of these cleats are beveled from the points back for some distance for the purpose of rendering it impossible for clay, mud, mixed clay and sand, or any other combination of soils to become so packed between the ends at $f$ as to cause unnecessary lateral strain on the belt, or to render the cleats inoperative, or to so wedge them apart as to render the surface of the belt uneven and to cramp the sides of the tire with the ribs 4. The cleats A are somewhat shorter than the width of the belt and are beveled at the ends. The cleats 3 and A are placed on the belt alternately so they each will assist the other in holding the belt rigidly in position on the tire, and will, at the same time, allow of sufficient flexibility in the belt to cause it to be readily adjusted to any unevenness in the roads, or to readily respond to any sudden contact with an unyielding object as a stone or hard hubble in the road.

To properly support the belt 2 and its cleats 3 and A on the tire 1 it is necessary to provide a series of ribs, as 4, so arranged that they may be set in pairs, with a division between them close to the center of the belt 2, similar to the division on the cleats 3, so that they may be made to give slightly to the uneven places in a road bed. I prefer that these ribs be made of sheet metal, and for their construction I form a blank, substantially of the form shown in Fig. 4, the heavy lines being a practical outline of said blank. To form the ribs from these blanks, the sides are bent in one direction practically on the dotted lines $b$ $b$ to form the sides and outer surface of the ribs. Then the part 9 is bent practically on the lines $d$ $d$ to form flanges on the surface that rest upon the sides of the tire, that will extend up a short distance on the sides, as indicated at 6 6 in the several views. This portion is then formed to closely fit the curved edges of the sides of the rib, and conform to the circle of the tire they are to be used upon. Then a circle or loop 5 is formed between the dotted lines $c$ $c$ in Fig. 4 and the portion 9 bent around to position to properly engage the edges of the sides of the ribs. The parts 7 7, see Fig. 4, are bent outward on the line $a$ to form flanges with which to rivet or secure the ribs to the belt 2, and the part 10 is bent inward for the purposes, first, of forming a bearing for the belt at the edge, and, second, to form a support to which the outer ends of the cleats 3 3 may be riveted. Before the ribs are completed I have an offset, as 8, struck outward practically as shown in Fig. 5. This offset is designed to be forced into the surface of the tire 1 when bearing the weight of the vehicle and its load, for the purpose of preventing the creeper from slipping on the tire.

The circles or loops 5 5 are designed to receive and hold eye bolts 16, 16, to which the chain links 17 are secured to form a retaining element around each side of the tire 1 at the inner ends of the ribs, so that the creeper cannot, by any possible means, slide laterally upon, or be thrown off of the tire, no matter how uneven the surface of the road bed may be.

With this construction it is readily seen that the creeper must be opened at some point so it may be placed on the tire, when on the vehicle wheel, as at $g$ on Fig. 3, and means must be provided for drawing and securing these ends together, and for this purpose any available form of lever or clamp may be used to draw the cleats 3, on one side of the division $g$, and the cleat A on the other side of the division, together so the swivel screws 15 15 may be made to engage the nuts 14, 14, of which there are two sets; one set of the swivels being connected with the eye bolts 11 at the outer end of the ribs 4, and the other set connected with the eye bolts 16 at the inner ends of the ribs 4 so the screws 15 may be screwed into said nuts to draw the belt 2 solidly and securely around the tire, and hold it firmly in place. To anchor the toggle screws and nuts 15, 14, the eye bolts 16, to which the nuts 14 are secured, are made to pass through the ribs 4 and are securely anchored to the links 17 and to avert the danger of drawing the sides of the ribs out of place I place tubular anchors in position for the bolts 13 to pass through, as indicated at 12, which anchors must be of a proper length to exactly fit between the sides of the ribs at this point, it being necessary to have these anchors only at the outer ends of the ribs, as the circles or loops 5 at the other, or inner ends of the ribs are sufficiently strong to withstand any draft that may be brought to bear upon the eye bolts therein. The other set of toggle screws is attached to the eye bolts 11, 11, said eye bolts being passed through the cylinders 12, and securely anchored therein, as at 13 13. When the belt 2 has been properly stretched around the tire it is necessary to provide some means for holding the ends of the belt at $g$ firmly down on the surface of the tire, and for this purpose any available device may be used. In the present instance I have shown wires or rods, 18, passed through the cleats 3 and A over these loose ends, and the ends of the wires or rods bent around against the sides of the cleats, as at $h$ $h$, so they cannot draw through the cleats.

It is to be understood that as many of these rods may be used as is desired or necessary to properly hold the ends of the belt in place.

In Fig. 2 I have shown the walls 19 of the ribs 4 cut away practically on the line $y$ $y$ of Fig. 7 for the purpose of disclosing the positions of the anchor tubes 12, and of the lugs 10.

This creeper may be placed on the tire either by jacking the axletree of the vehicle up so the wheel will be clear of the ground and slipping the creeper around the tire, or by placing the creeper on the road bed back, or forward of the wheel and running the wheel upon it, and then passing the creeper around the tire and securing it thereon, substantially as hereinbefore indicated, or by any available means.

The peculiar manner of securing this creeper to the tire, by means of the chain connections 16—17 and the screw coupling 14—15—16, insures the perfect retention of the creeper without the least danger of marring the rim of the wheel, and avoids all possible danger of the creeper sliding over sidewise on the tire, or creeping around the tire.

If the two piece cleats 3 3 were used alone, without some auxiliary element the continual depression of their outer ends when traveling over uneven road beds, would tend, first, to chafe and wear the sides of the tire where the ribs 9 come in contact with it, and, second, by continual bending along the center line of the belt, to split the belt along this line, and the short integral cleats 11 are interposed between the cleats 3—3 for the purpose of strengthening this particular part of the belt and averting all danger of injury by the continual movement of the two piece cleats. They, also, insure better traction, as by this means every portion of the surface of the belt is allowed to conform itself to the track or bed made by the creeper as the wheel is driven over soft sandy surfaces, and all danger of the wheel continuing to revolve after the machine has come to a stand still, is, practically, eliminated.

What I claim as new, and desire to secure by Letters Patent of the United States, is:

1. In a sand creeper for automobiles, a flexible belt surrounding the tire, cleats mounted on the outer surface of said belts and extending from each edge to the center of the belt the adjacent ends of said cleats chamfered to an edge, and ribs made to conform to the lateral contour of the tire and secured to the belt, and means for stretching and securing the creeper on the tire.

2. In a creeper for automobile wheels, a flexible belt, cleats secured to the outer surface of the belt and extending from the edges to near the center of the belt, the meeting ends of the cleats chamfered to form an outwardly opening angle between said ends, a second series of cleats shorter than the width of the belt and secured thereto alternately with the first series of cleats, ribs secured to the opposite side of the belt and arranged to conform to the lateral contour of the tire, and means for securing the creeper around the tire.

3. In a creeper for automobiles, a flexible belt, a series of cleats divided laterally at their longitudinal center and the adjacent ends of the two pieces of each cleat chamfered to form outwardly opening angles between these ends, ribs secured to the opposite side of the belt and made to conform to the lateral contour of an automobile tire, circular loops formed at the inner ends of the ribs, eye bolts passed through said loops, chain links connected with said eye bolts to form a continuous chain of links around the inner edge of the creeper ribs, means for drawing and firmly securing the belt around an automobile wheel and for securing and holding the meeting pieces of the belt.

4. In a sand creeper for automobile wheels and tires, a flexible belt, cleats secured crosswise of the outer surface of the belt, ribs secured to the inner surface of the belt and made to conform to the lateral contour of the tire, said ribs made of sheet metal and having a closed outer wall and a smooth even surface to bear upon the surface of the tire, chains connected with, and connecting the inner ends of the ribs, offsets formed in the surface plates of the ribs to engage the surface of the tire to prevent the creeper from slipping on the tire, and swivel nuts and screws connected with the outer corner and the inner ends of the two ribs adjacent to the meeting ends of the belt to draw and hold the belt firmly on the tire, and means for holding the meeting ends of the belt securely on the surface of the tire.

5. In a sand creeper for automobile wheels and tires, a flexible belt, cleats secured at intervals to the outer surface of the belt, and means for drawing the belt firmly around the tire and securing the ends thereof, in combination with a series of ribs made of sheet metal secured to the inner surface of the flexible belt and having a body with sides cut and bent to conform to the contour of the tire, a fold having upturned flanges at the edges to lap upon the sides, said fold formed to conform to the concave edges of the sides of the ribs and the concave surface of the tire, and means connected therewith to draw and hold the creeper firmly on the tire.

Signed at Boyne Falls, Michigan, April 25, 1914.

FRANK L. PEARSON.

In presence of—
W. A. DAVOLL,
NELLIE H. DAVOLL.